United States Patent [19]

Lee

[11] Patent Number: 5,731,836
[45] Date of Patent: Mar. 24, 1998

[54] METHOD OF VIDEO ENCODING BY ACCUMULATED ERROR PROCESSING AND ENCODER THEREFOR

[75] Inventor: Shi-hwa Lee, Seoul, Rep. of Korea

[73] Assignee: Samsung Electronics Co., Ltd., Kyungki-do, Rep. of Korea

[21] Appl. No.: 710,861

[22] Filed: Sep. 23, 1996

[30] Foreign Application Priority Data

Sep. 22, 1995 [KR] Rep. of Korea ............... 95-31753
Nov. 8, 1995 [KR] Rep. of Korea ............... 95-40567

[51] Int. Cl.$^6$ ............................ H04N 7/30; H04N 7/50
[52] U.S. Cl. ...................... 348/402; 348/416; 382/308
[58] Field of Search .......................... 348/402, 412, 348/416; 382/308; H04N 7/30, 7/50, 7/133

[56] References Cited

U.S. PATENT DOCUMENTS

| | | | |
|---|---|---|---|
| 4,665,554 | 5/1987 | Sternberg | 382/308 |
| 5,325,125 | 6/1994 | Naimpally | 348/402 |
| 5,365,271 | 11/1994 | Asano | 348/402 |
| 5,420,638 | 5/1995 | Riglet | 348/409 |
| 5,436,984 | 7/1995 | Serkkinen | 382/302 |
| 5,583,947 | 12/1996 | Florent | 348/169 |

OTHER PUBLICATIONS

"Video Codec For Audiovisual Services At p x 64 kbit/s", The International Telegraph and Telephone Consultative Committee, Geneva, 1990, Recommendation H.261, pp. 1–27.

Limin Wang, "Error Accumulation in Hybrid DPCM/CDT Video Coding", SPIE, vol. 2308, pp. 343–352.

*Primary Examiner*—Howard W. Britton
*Attorney, Agent, or Firm*—Leydig, Voit & Mayer, Ltd.

[57] ABSTRACT

The present invention relating to a method of video coding associated with processing accumulated errors and a encoder therefor, the method comprising the steps of: (a) generating motion vectors of an input image in a predetermined unit and the difference image between an image of filtering a motion-compensated image on a reconstructed previous frame and the input image on current frame, and then performing discrete cosine transform (DCT), quantization and variable length coding on the difference image; (b) generating the motion-compensated image on the reconstructed previous frame from the reconstructed previous frame and the motion vectors; and (c) filtering off accumulated errors while preserving the edges within the motion-compensated image on the reconstructed previous frame. Therefore, random distributed noises due to accumulated errors can be removed and bit generation amounts by filtering off random accumulated errors with a high frequency characteristics before coding can be reduced.

7 Claims, 8 Drawing Sheets

METHOD OF VIDEO ENCODING BY ACCUMULATED ERROR PROCESSING AND ENCODER THEREFOR

BACKGROUND OF THE INVENTION

The present invention relates to a method of video encoding by accumulated error processing and an encoder therefor. More particularly, the present invention relates to a method of video encoding for filtering errors accumulated during encoding a video sequence by an edge retention filter using a morphological filtering method and an encoder therefor.

Hybrid DPCM/DCT (Differential Pulse Coded Modulation/Discrete Cosine Transform) video coding has been adopted in many international standards (MPEG1, MPEG2) and recommendations (H.261) for video compression because of its high performance and its simple construction. Generally, natural scenes have a high degree of redundancy in both temporal and spatial domains. Hybrid DPCM/DCT video coding can remove the temporal redundancy using motion prediction and compensation, and can remove the spatial redundancy using a block DCT which concentrates the block energy into a few low order DCT coefficients in a DCT domain. The DCT coefficients are then quantized and variable length encoded.

FIG. 1 shows a simplified block diagram of a conventional hybrid DPCM/DCT video encoder.

In FIG. 1, motion estimator 12 generates motion vectors in units of blocks within an input video sequence 11, and subtracter 13 generates the difference image between the motion-compensated block generated in motion compensator and frame memory 20 and the original corresponding block within the input video sequence 11. The difference image from subtracter 13 undergoes DCT in discrete cosine transformer (DCT) 14, quantization in quantizer 15, zigzag scan and variable length coding in variable length coder (VLC) 16 and then is transmitted to a decoder (not shown).

Inverse-quantizer 17 to motion compensator and frame memory 20 are parts for generating the motion-compensated block used in subtracter 13 whose operation is identical to that in a decoder. That is, the block quantized in quantizer 15 is inverse-quantized in inverse-quantizer 17, and undergoes inverse DCT in inverse-DCT (IDCT) 18 to change from DCT domain into spatial domain. Adder 19 receives and adds a difference image introduced into the spatial domain in IDCT 18 to the motion compensation block which is the same as that transmitted from motion compensator and frame memory 20 to subtracter 13 to generate a reconstructed frame. The reconstructed frame is the same as that generated in a decoder. Motion compensator and frame memory 20 stores the reconstructed frame transmitted from adder 19 and generates a new motion-compensated block using the motion vector transmitted from motion estimator 12 and the reconstructed frame stored in itself.

As coding on video sequence is performed according to a process such as that shown in FIG. 1, errors generated in the quantizer 15 effect the following process within a limited range. Such a quantization error is accumulated and increased until the value reaches a specific value or until an intra-frame coding mode starts to work. In intra-frame coding, periodic motion prediction and compensation is not performed on a frame, but DCT, quantization, and variable length coding are performed thereon, as shown in still image coding, for preventing the errors due to successive motion prediction and compensation from being accumulated. But such intra-frame coding requires a large amount of bits because it does not consider the temporal redundancy between neighboring frames. Accumulated errors don't have a large size but have a random distribution. When a signal has a random distribution without having redundancy, a large amount of bits is required for coding and when proper processing is not performed, high frequency noise occurs over a whole frame.

The DCT in a encoder having such a general construction as shown in FIG. 1 tends to concentrate the energy on the frame with a great deal spatial redundancy. But, since the accumulated errors with a random distribution have a poor spatial redundancy, the degree of energy concentration in DCT becomes poor. Accordingly, if the quantization stepsize increases to reduce the bit generation amounts during coding, the video quality becomes deteriorated and the accumulated errors due to quantization increase, which causes a continuous vicious circle.

Limin Wang suggests a method for reducing error accumulation in hybrid DPCM/DCT video coding. According to the Wang's method, when the bit generation amounts for the motion prediction errors increase and become greater than that for coding the input frame directly, use of a loop filter for shifting into the intra-frame mode can reduce the error accumulation.

FIG. 2 shows a block diagram of an encoder according to the Wang's suggested method. But Wang's method has several problems. The first problem is no processing can be performed until the accumulated errors reach a specific value. The problem second is that the DCT operation on an input sequence and the motion prediction error should be performed in all cases without exception. The third problem is that the use of intra-frame mode requires additional bit generation amounts though it can prevent error accumulation.

According to H. 261 (recommendation published by International Telecommunication Union), a loop filter is used on a motion-compensated block as a kind of low frequency band filter. The filter is a simple three tab filter whose filter coefficients are ¼, 1/2, and ¼ for twice first-order filtering, in a horizontal direction and in a vertical direction, respectively. Such a simple low frequency band filter tends to remove the edge components of the motion-compensated block fatally and, therefore, a deterioration of the video quality and an increases of the bit generation amounts can be caused.

Meanwhile, image simplification serves to reduce superfluous information while retaining necessary information for an image and thus facilitates extraction of the necessary information for the image. Without image simplification, a segmentation technique used in image processing fields such as computer vision or image coding produces too many unnecessary segments, resulting in impossibility or inefficiency of image processing. In addition, since image simplification functions to decrease the noise of an image, even an image including noise can be more stably processed.

Image edges are essential information in most image processing applications. Thus, planarization should be performed while keeping as much edge information of edges as possible, for image simplification.

A detailed description of a morphological filter technique is provided in *Edge versus contrast estimation of morphological filters* by P. Salembier, J. Serra, J. A. Bangham, 1993, IEEE and *Hierarchical morphological segmentation for image sequence coding* by P. Salembier and M. Pardas, 1994, IEEE. Such a technique pertains to image simplification by morphological filtering in the process of segmentation for image coding. Using the technique, an image is simplified, and several markers, each being defined as an area of adjacent pixels having an identical value, are extracted from the simplified image, and the image is segmented by a Watershed segmentation algorithm. Since this segmentation method is applied to a simplified image, the performance of segmentation is directly affected by image simplification.

In the above articles, 'opening by partial reconstruction' method or 'closing by partial reconstruction' method is used for image simplification. By these methods, planarization is implemented by lowering and then gradually increasing the level of a video signal, or by increasing and then gradually lowering the image signal level, thereby simultaneously producing a flattened signal and retaining edge information. However, despite the advantage, perfect planarization is impossible since only one peak toward a low level and one peak toward a high level can be eliminated. This will be described in detail with reference to the following equations.

Opening by partial reconstruction of P. Salembier is morphologically expressed as follows:

$$\gamma^{(rec)}(\gamma_n(f), \gamma_k(f)) \quad (1)$$

The following basic morphological operators are used in equation (1).

Erosion: $\epsilon_n(f)(x) = \text{MIN}[f(x+y), y \in M_n]$

Dilation: $\delta_n(f)(x) = \text{MAX}[f(x-y), y \in M_n]$ (2)

Geodesic dilation of size one: $\delta^{(1)}(f, r) = \text{MIN}[\delta^{1}(f), r]$ Geodesic erosion of size one: $\epsilon^{(1)}(f, r) = -\delta^{(1)}[(-f, r)](-f, -r)$ (3)

Reconstruction by dilation: $\gamma^{(rec)}(f, r) = \delta^{(\infty)}(f, r) = \delta^{(1)}(\ldots \delta^{(1)}(f, r) \ldots, r)$ Reconstruction by erosion: $\phi^{(rec)}(f, r) = \epsilon^{(\infty)}(f, r) = \epsilon^{(1)}(\ldots \epsilon^{(1)}(f, r) \ldots, r)$ (4)

Opening: $\gamma_n(f) = \delta_n(\epsilon_n(f))$

Closing: $\phi_n(f) = \epsilon_n(\delta_n(f))$ (5)

The technique of P. Salembier uses only the reconstruction-by-dilation of equation (4) as shown in equation (1). That is, first, an input signal for the reconstruction-by-erosion equation of equation (4) is obtained by maintaining or lowering the level of a received original signal through a first opening. Then, the original signal is transformed into a reference signal by a second opening. Here, the reference signal is almost similar to the original signal and cleared of fine noise signals, since the second opening uses a smaller structuring element than the first opening. Once the input signal and the reference signal for equation (4) are made, equation (4) is performed, in which the input signal is dilated by minimizing the structuring element. After the dilation, the result is compared with the reference signal, and the smaller is selected and input again. The dilation and the comparison are repeated until there is no variation in an output value of equation (4).

The above Salembier method shows its effectiveness in terms of edge retention and planarization, to a certain degree. However, planarization cannot be performed in a case where the original signal is altered by low-level noise of a low-level value. That is, when the reference signal has a smaller value than a compared signal, the reference signal is selected, thus making signal flattening impossible, since a smaller value is selected in the comparison of equation (4). Increasing the size of the structuring element in producing the reference signal to circumvent this problem improves planarization, but considerably decreases capability of edge retention.

FIG. 3 is a graph comparing an original signal with a signal obtained by one-dimensionally simplifying a portion of an image by the Salembier method. From the figure, it is noted that the simplified image signal preserves a peak toward a low level, showing limitations of effective planarization in the Salembier method.

SUMMARY OF THE INVENTION

The one object of the present invention is to provide a method of video coding with processing accumulated errors and a encoder therefor, which transfers the difference image between an input original image and a motion-compensated image to an easy form for coding so that bit generation amounts during coding can be reduced as a whole and the reconstructed video quality can be improved.

The another object of the present invention is to provide an image simplifying method by morphological filtering, for producing more flattened areas and retaining more edge information than the prior art.

To achieve one object, a method of video coding with processing accumulated errors according to the present invention comprises the steps of:

(a) generating motion vectors of an input image in a predetermined unit and the difference image between an image of filtering a motion-compensated image on a reconstructed previous frame and the input image on current frame, and then performing discrete cosine transform (DCT), quantization and variable length coding on the difference image;

(b) generating the motion-compensated image on the reconstructed previous frame from the difference image and the motion vectors; and (c) filtering off accumulated errors while preserving the edges within the motion-compensated image on the reconstructed previous frame.

Here, it is desirable that the filtering step is according to a morphological filtering method. And, the filtering is not performed on a refresh frame without the accumulated errors.

To achieve one object, a encoder for video coding associated with processing accumulated errors according to the present invention comprises:

coding means for generating motion vectors of an input image in a predetermined unit and the difference image between an image of filtering a motion-compensated image on a reconstructed previous frame and the input image on current frame, and then performing discrete cosine transform (DCT), quantization and variable length coding on the difference image;

means for generating the motion-compensated image on the reconstructed previous frame from the reconstructed previous frame and the motion vectors; and filter for filtering off accumulated errors while preserving the edges within the motion-compensated image on the reconstructed previous frame and transmitting the filtered motion-compensated image to the coding means.

To achieve another object, there is provided an image simplifying method by morphological filtering, comprising steps of:

(a) sequentially performing dilation and a first erosion on a received original signal by using a structuring element of a first predetermined size, and performing a second erosion on the first-erosion processed signal by using a structuring element of a minimum size;

(b) selecting the higher-level signal of the signal resulting from the step (a) and the original signal;

(c) comparing the signal resulting from the step (b) with the first-erosion processed signal;

(d) repeatedly performing the second erosion and the steps (b) and (c) if the signal resulting from the step (b) is different from the first-erosion processed signal in the step (c);

(e) sequentially performing erosion and a first dilation on the original signal by using a structuring element of a second predetermined size, and performing a second dilation on the first-dilation processed signal by using the structuring element of a minimum size;

(f) selecting the lower-level signal of the signal resulting from the step (e) and a signal generated when the signal resulting from the step (b) is identical to the first-erosion processed signal in the step (c); and (g) repeatedly performing the second dilation and the steps (e) and (f) if the signal resulting from the step (e) is different from the first-dilation processed signal, and a final simplified signal is output if the signal resulting from the step (e) is identical to the first-dilation processed signal.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

A preferred embodiment according to the present invention is described below with reference to the attached drawings.

Figure 1:
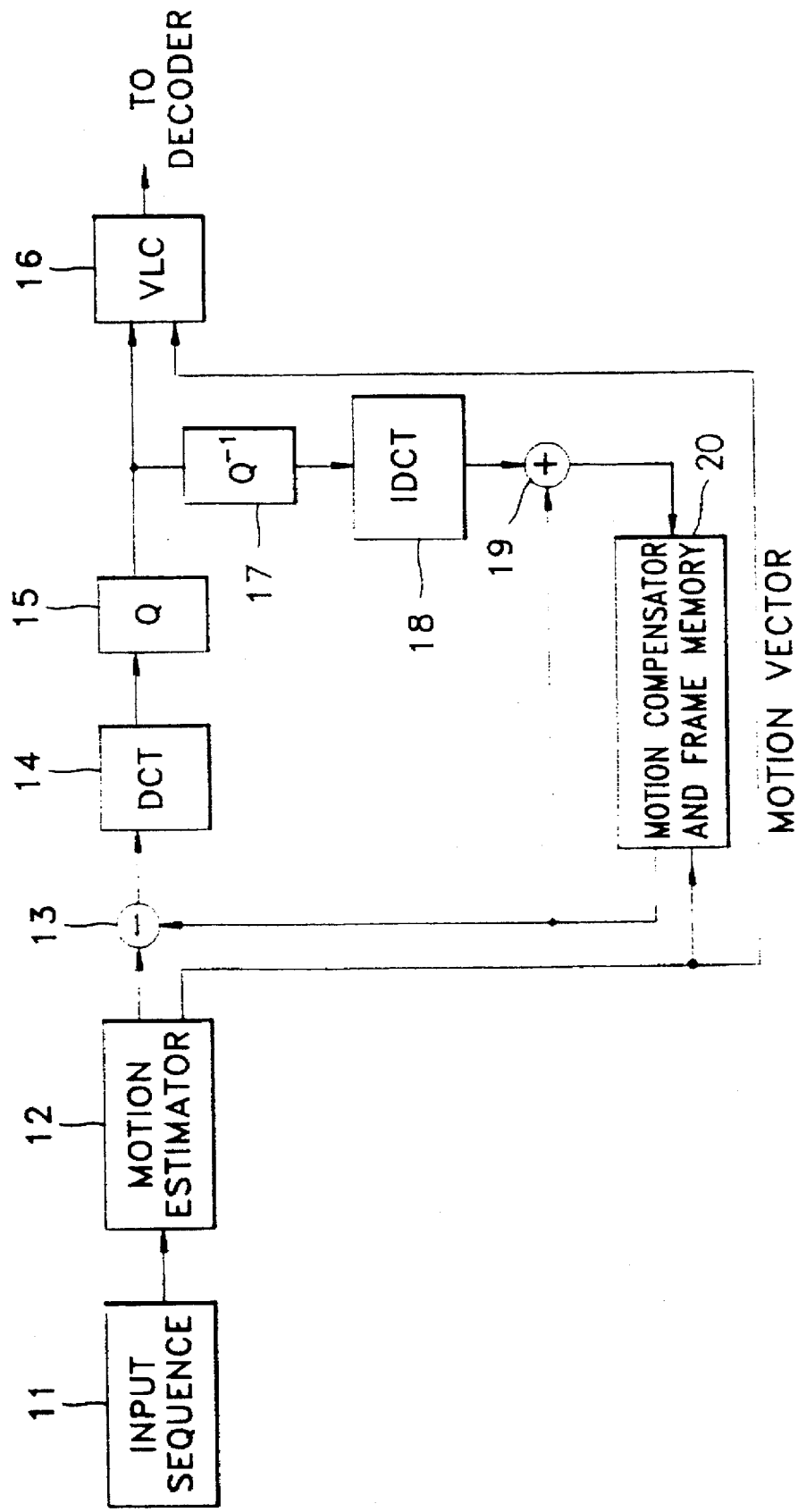
FIG. 1 shows a simplified block diagram of a conventional hybrid DPCM/DCT encoder.
Figure 2:
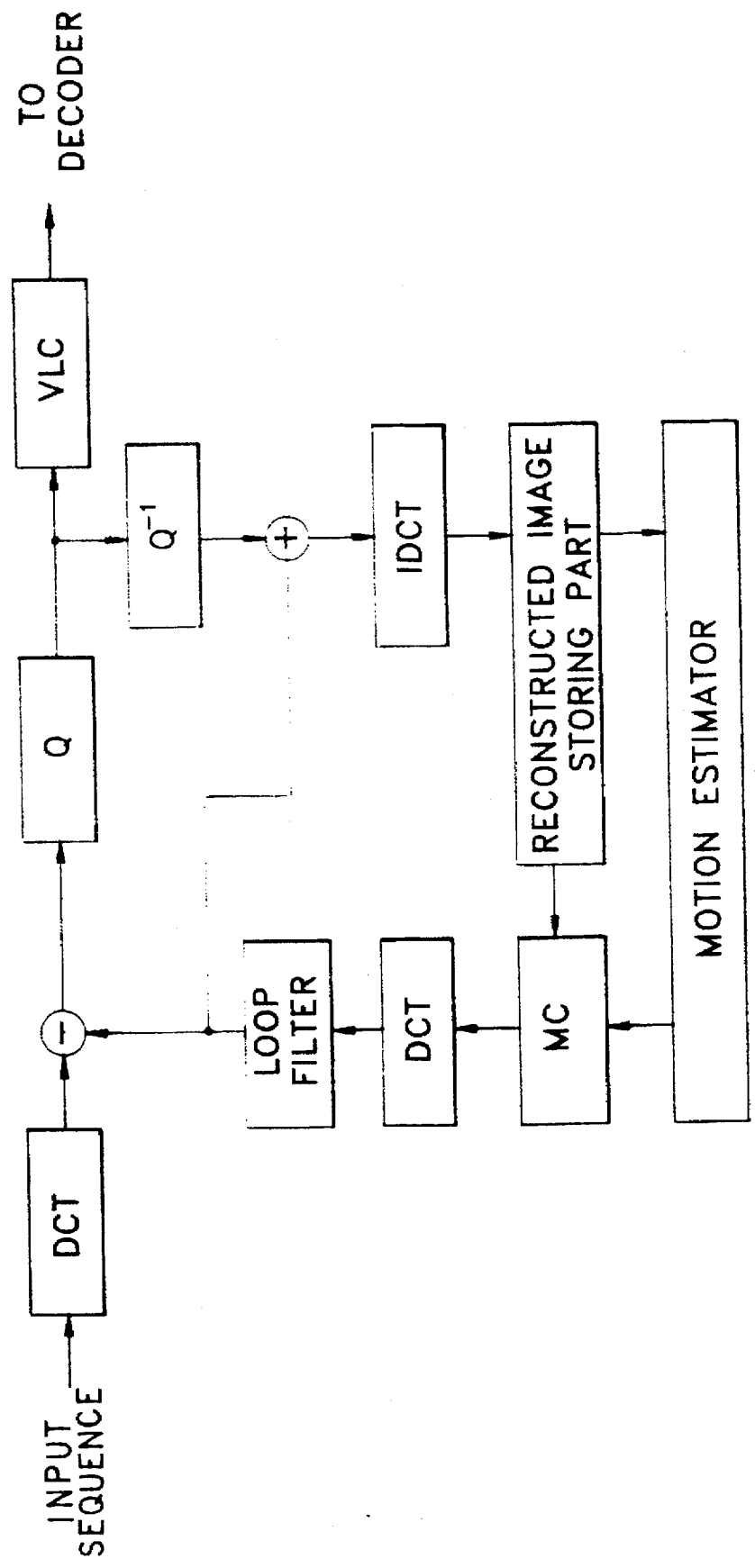
FIG. 2 shows a simplified block diagram of a encoder according to Lemin Wang's suggestion.
Figure 4:
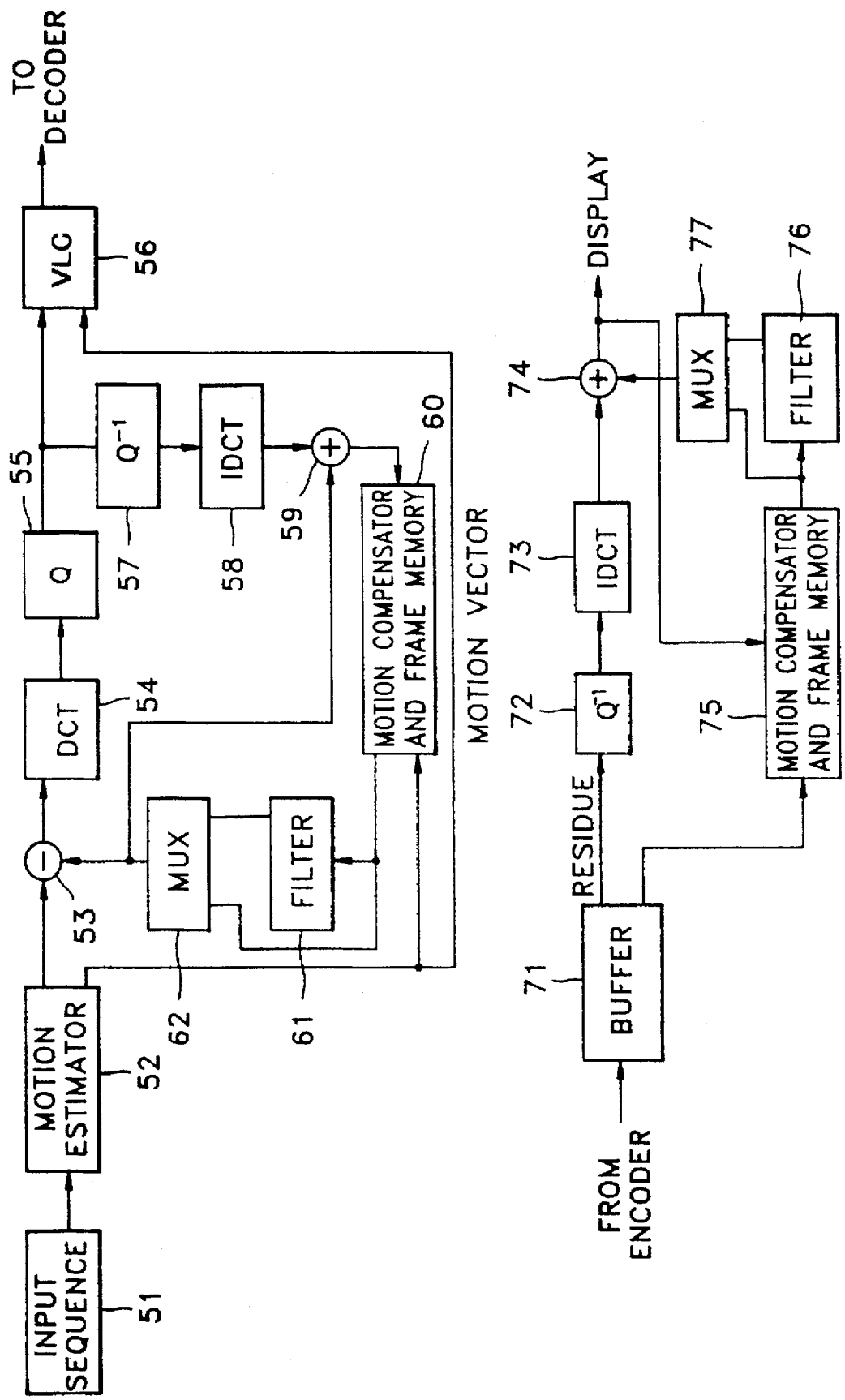
FIG. 4 shows a simplified block diagram of a encoder according to the present invention.

As shown in FIG. 4, the encoder according to the present invention has a basic construction similar to the encoder shown in FIG. 1. However, the encoder depicted in FIG. 4 includes a filter 61 for filtering the motion-compensated image generated from the motion compensator and frame memory 60. That is, the encoder shown in FIG. 4 includes a coding means. The coding means includes input sequence 51, motion estimator 52, subtracter 53, DCT 54, quantizer 55 and VLC 56. Inverse quantizer 57, inverse DCT 58, adder 59 and motion compensator and frame memory 60 together a means for generating a motion-compensated image. In accordance with the invention, a filter 61 is coupled to the motion compensator frame memory 60 and to a multiplexer 62. The multiplexer 62 is coupled to the subtracter 53, the adder 59, the motion compensator and frame memory 60 and the filter 61. Here, the codin9 means generates motion vectors of an input image in a specific unit, generates the difference image between an image of filtering the motion-compensated image on a reconstructed previous frame and the input image on current frame and performs discrete cosine transform (DCT), quantization and variable length coding on the generated difference image. The means for generating the motion-compensated image on the reconstructed previous frame will be subtracted from the reconstructed previous frame and the motion vector in the subtracter 53. The filter 61 filters off the accumulated errors while preserving the edges within the motion-compensated image on the reconstructed previous frame and then transmits the filtered motion-compensated image into the subtracter 53. And the multiplexer 62 selects the motion-compensated image transmitted from the motion compensator and frame memory 60 instead of the filtered motion-compensated image transmitted from filter 61 and then transmits it to the subtracter 53, when the motion-compensated image generated in the motion compensator and frame memory 60 is a refresh frame without accumulated errors.

Considering the operation of the encoder according to the present invention shown in FIG. 4, most random high frequency components included in the motion-compensated image generated from the motion compensator and frame memory 60 are filtered off from the motion-compensated image by the filter 61. That is, the error image generated in the subtracter 53, a difference between the filtered motion-compensated image and the original input image, has seldom such random distributed errors. Thus, the error image transformed into DCT domain in the discrete cosine transformer (DCT) 54 becomes distributed within low frequency band so that zigzag scan in the variable length coder 56 can be performed effectively. Because the present invention relates to accumulated error processing, a refresh frame without accumulated errors is subject to the processing shown in FIG. 1 without passing through the filter of the present invention. So, the multiplexer 62 serves the function of switching between the motion-compensated image on the reconstructed previous frame and the filtered motion-compensated image.

The decoder for decoding the bitstream generated by the encoder is constructed by buffer 71, inverse-quantizer 72, inverse-DCT 73, adder 74, motion compensator and frame memory 75, filter 76 and multiplexer 77, as shown in FIG. 4. Here, individual operation of each component is identical to that in the encoder. Also, since the operation of the decoder corresponds to inverse-order operation of the encoder, a detailed description of operation of the decoder is omitted.

Figure 5:
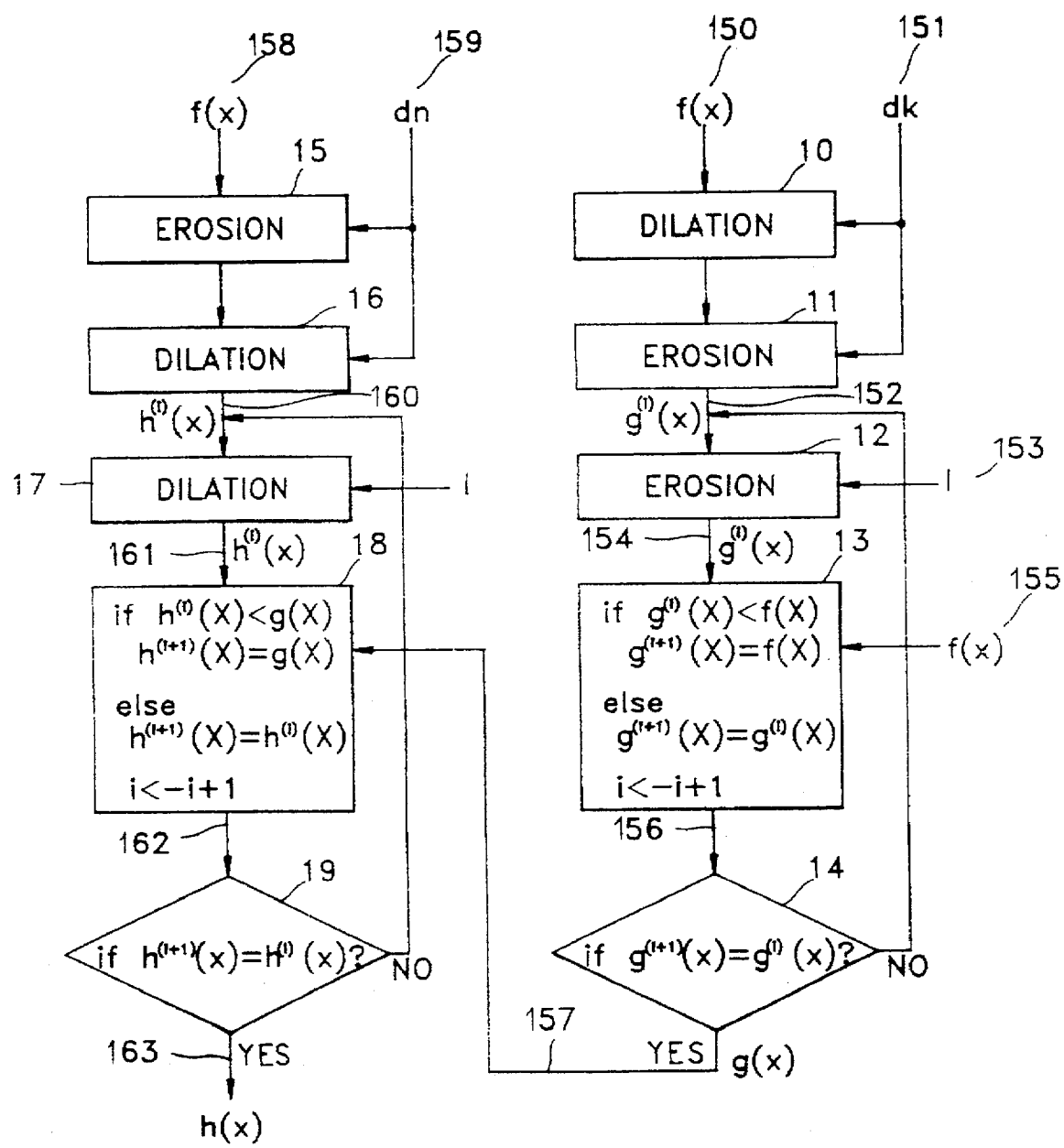
FIG. 5 shows a flow chart for explaining the operation of the filter shown in FIG. 4.

The filters 61 and 76 according to the present invention are preferably designed to remove randomly distributed noises while preserving the edges with a high frequency characteristics. Considering such characteristics, the present invention adopts a morphological filter whose operation is shown in FIG. 5. The morphological filter can be implemented by any type of computer or computer device.

Referring to FIG. 5, reference numerals 150, 151, 158, and 159 denote input signals used in the present invention. Signals 150 and 158 are identical and will be processed together with a video signal. Signals 151 and 159 indicate the sizes of structuring elements. A structuring element is a window of a general filter. If the size of the structuring element is k, the output signal value at the (i)th position is determined by the input signal values at the (i−k)th to (i+k)th positions. Since the present invention can be applied to multi-dimensional signal processing as well as one-dimensional signal processing, the size of a structuring element varies with the dimension of a used signal. Here, it is assumed that signals are one-dimensional.

A received original signal f(x) 150 and structuring element dk 151 are dilated in step 10. The result is subjected to erosion processing in step 11. An output value 152 resulting from step 11 is subjected to erosion processing by using a structuring element 153 of a minimum size 1 and g 154 is generated, in step 12. Here, g 154 and the original signal f(x) 155 as a reference signal are compared, and the higher-level signal of the two is selected as an output 156, in step 13. If the output 156 is different from the signal 152 in step 14, steps 12, 13 and 14 are repeatedly performed. If the signal 152 is identical to the signal 156 in step 14, a signal 157 is output to be used as a reference signal in step 18.

In step 15, the original signal f(x) 158 is subjected to erosion processing by using the structuring element dn 159. In step 16, the result is dilated. The resulting signal 160 is dilated by using the structuring element with a minimum size 1, thereby generating h 161, in step 17. Here, h 161 is compared with g 157, and the lower-level signal of the two is selected, in step 18. If the output signal 162 is different from the signal 160 in step 19, steps 17, 18, and 19 are repeatedly performed. If the signal 162 is identical to the signal 160 in step 19, a signal 163 is output as a final simplified signal.

As noted from the simplification process of the Salembier method, a peak toward a low level cannot be flattened by the opening-by-partial-reconstruction. A peak toward a high level is not flattened either by the closing-by-partial-reconstruction.

The present invention can remove peaks in both directions by a combination of the two methods. That is, the opening-by-partial-reconstruction flattens not a peak toward a low level, but a peak toward a high level, effectively. In contrast, the closing-by-partial-reconstruction effectively flattens a peak toward a low level. Thus, peaks in both directions can be flattened by a combination of the two methods. A simplifying operational equation used in the present invention is given as follows:

$$\gamma^{(rec)}(\gamma_n(f), \phi^{(rec)}(\phi_k(f), f))\phi^{(rec)}(\phi_n(f), \gamma^{(rec)}(\gamma_k(f), f)) \quad (6)$$

In equation (6), a peak toward a low level (or toward a high level) is eliminated in the second operand reconstruction, and a peak toward a high level (or toward a low level) is eliminated in the next reconstruction. Consequently, the peaks in both directions are removed. Therefore, more effective simplification is allowed by retaining significant edges as in the Salembier method and removing all peaks.

Figure 3:
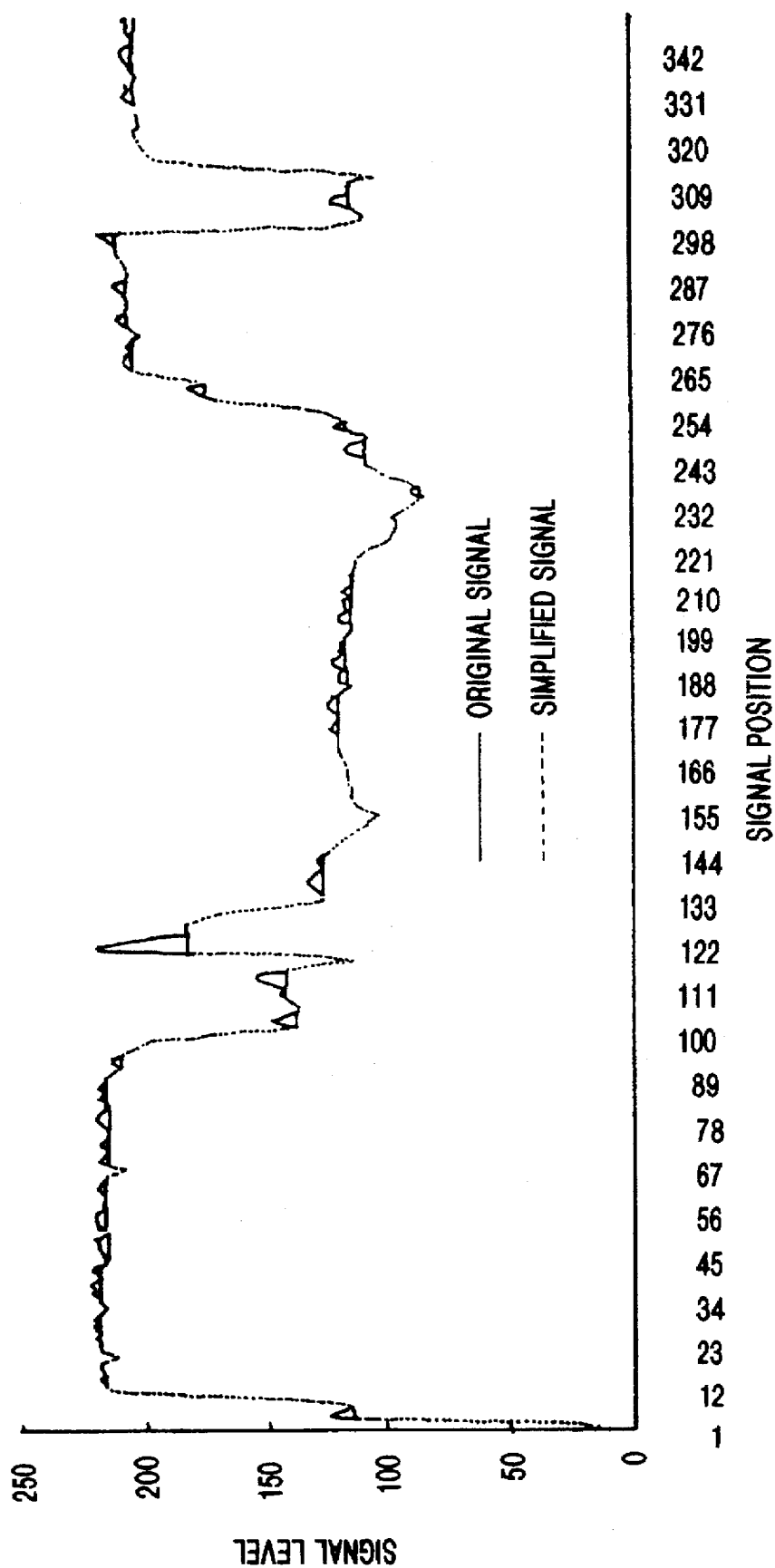
FIG. 3 is a graph comparing an original signal with a signal simplified by the Salembier method.
Figure 6:
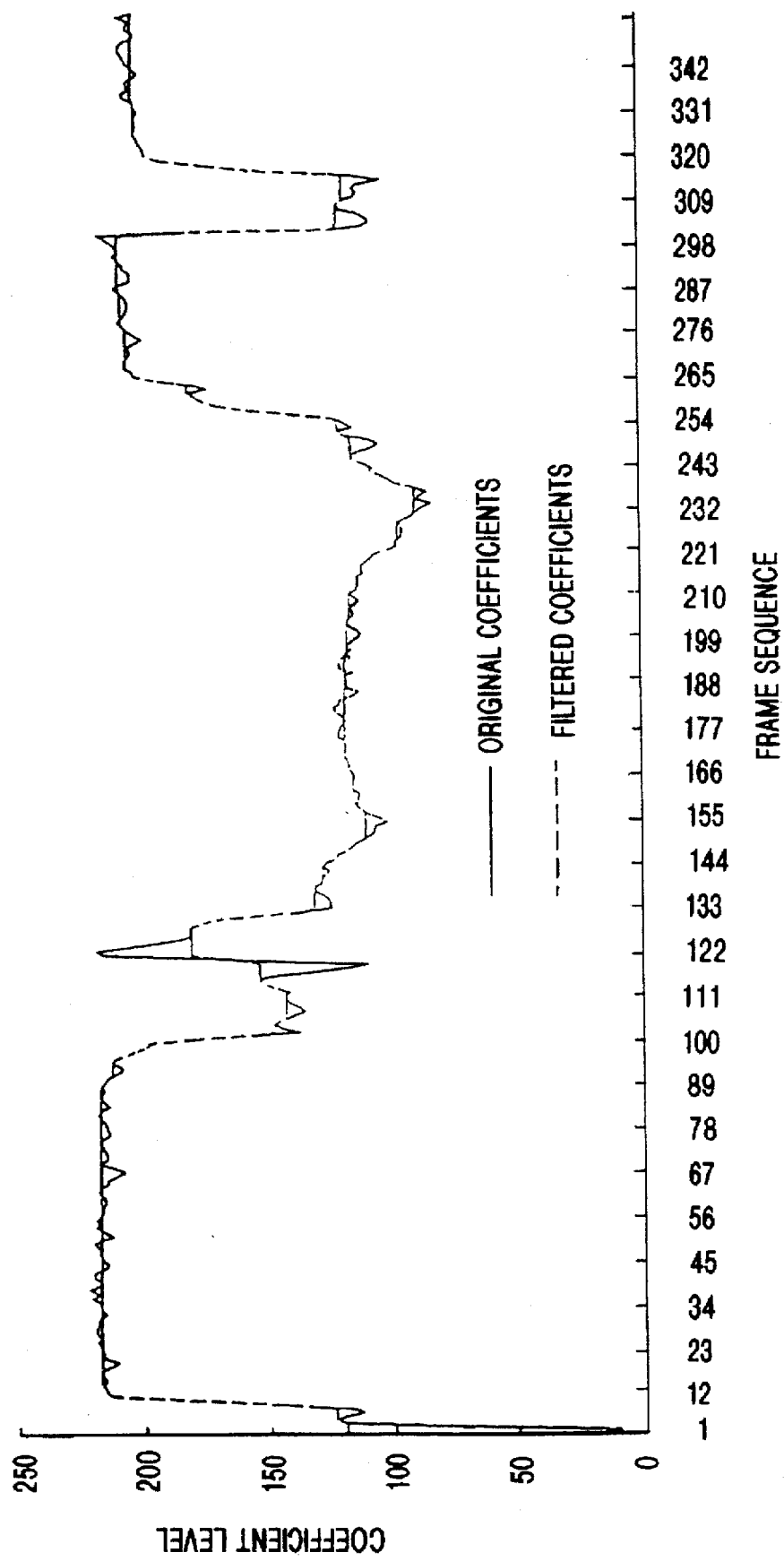
FIG. 6 is a graph comparing an original signal with a signal simplified by the image simplifying method of the present invention.

FIG. 6 is a graph comparing an original signal and a signal simplified by the method suggested in the present invention. Here, dn is the same size structuring element as that of the Salembier method and dk is as large as dn, in contrast to the Salembier method. When dk is as large as dn in the structure of the Salembier method, edge information is lost, while in the structure of the present invention, there is no loss of important edge information and only the degree of planarization is determined. From FIG. 6, it is noted that all peaks in both directions are removed and important edge information as shown in FIG. 3 is retained.

An arbitrary line extracted from a general image was used as data in this experiment. The results of repeated experiments with other data also exhibit the characteristics of FIGS. 3 and 6. Therefore, a signal processed in the structure of the present invention retains significant edges and is effectively flattened.

The image simplifying method by morphological filtering according to the present invention can be applied to pre- and post-processing of a video signal.

As described above, the image simplifying method by morphological filtering according to the present invention has the following advantages: (1) in contrast to the prior art, peaks in both directions can be removed and important edge information can be retained, simultaneously; (2) the degree of simplification can be controlled according to the sizes of the structuring elements of the signals 151 and 159 shown in FIG. 5; (3) noise can be effectively removed with a small degree of simplification; and (4) simplification to a large degree, which flattens a signal except for significant edges, can effect pre-processing for, for example, segmentation.

Meanwhile, compared with the prior art, the present invention is more effective to improve the reconstructed video quality and reduce bit generation amounts as well by removing the accumulated errors added on the motion-compensated image during video sequence coding using a filter.

For the sake of simplification, the values of all pixels of an original image f are assumed to be equal. When a noise signal g has a mean size m and a random distribution, the image f including noises can be expressed as shown below.

$$f=f+g \quad (7)$$

Considering the filtering function H in the present invention $$H(f)=H(f)+H(g)=n+H(g)=n+m \quad (8)$$

When m, difference value between the value obtained from equation (8) and the original image f, undergoes DCT, only DC component is obtained. Thus, the zigzag scan and variable length coding thereon can be performed effectively.

Even though pixel values of a practical original image are not equal, the pixels generally have a spatial redundancy, i.e., the surroundings of a pixel tend to have similar values to one another. And because the motion-compensated image added random distributed noises due to the accumulated errors is filtered and therefore most of small scale of high frequency components therein are removed, the DCT coefficients with respect to the difference between the original image and the filtered motion-compensated image become almost distributed on a low frequency band. Thus zigzag scan thereon can be performed effectively.

Moreover, because the filter used in the present invention preserves high frequency components as it preserves the edges of the image, contrary to a general low frequency band filter, it can give full play its efficiency even about the original image with high frequency components as like the edges.

Figure 7:
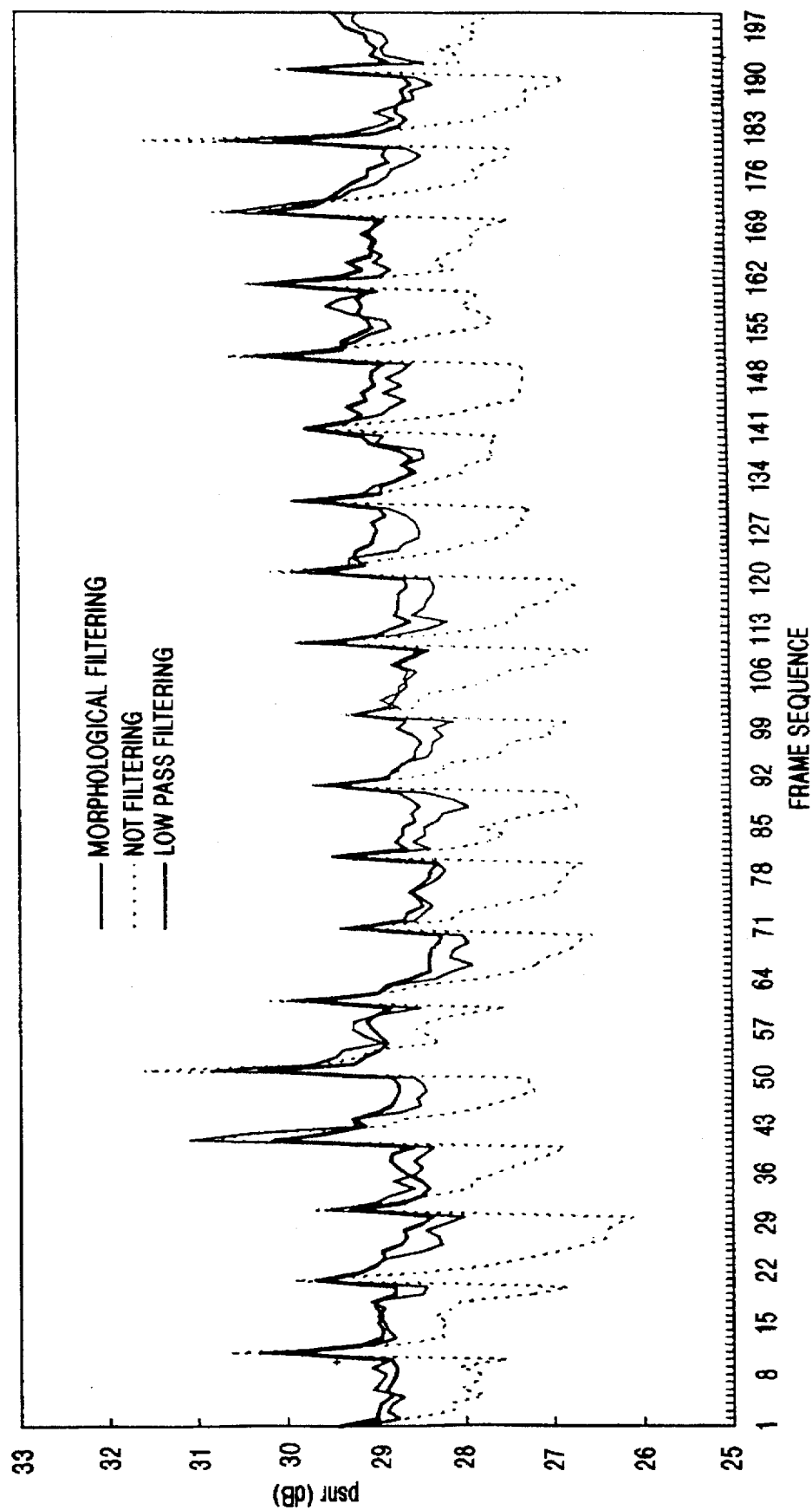
FIG. 7 shows a comparative waveform diagram on the PSNR of the reconstructed frame by the encoder according to the present invention shown in FIG. 4 and that by the conventional hybrid DPCM/DCT encoder shown in FIG. 1.

FIG. 7 shows PSNR (peak signal to noise ratio) of the reconstructed image generated by the encoder according to the present invention shown in FIG. 4 in comparison with that by the encoder shown in FIG. 1. and that by the encoder with the loop filter used in H.261 respectively. FIG. 7 relates to 200 sheets of input video sequence and the reconstructed image therein are refreshed by 10 sheets with reference to the original image. Compared with that by the encoder shown in FIG. 1, FIG. 7 shows that the quality of only the refreshed image becomes deteriorated. This is because the present invention is for removing the accumulated errors effectively; the refreshed image has no accumulated errors. Thus, the filter according to the present invention should not be used on the refreshed image for effective coding. The present invention can improve the picture quality by the maximum 2 dB as shown in FIG. 6.

Figure 8:
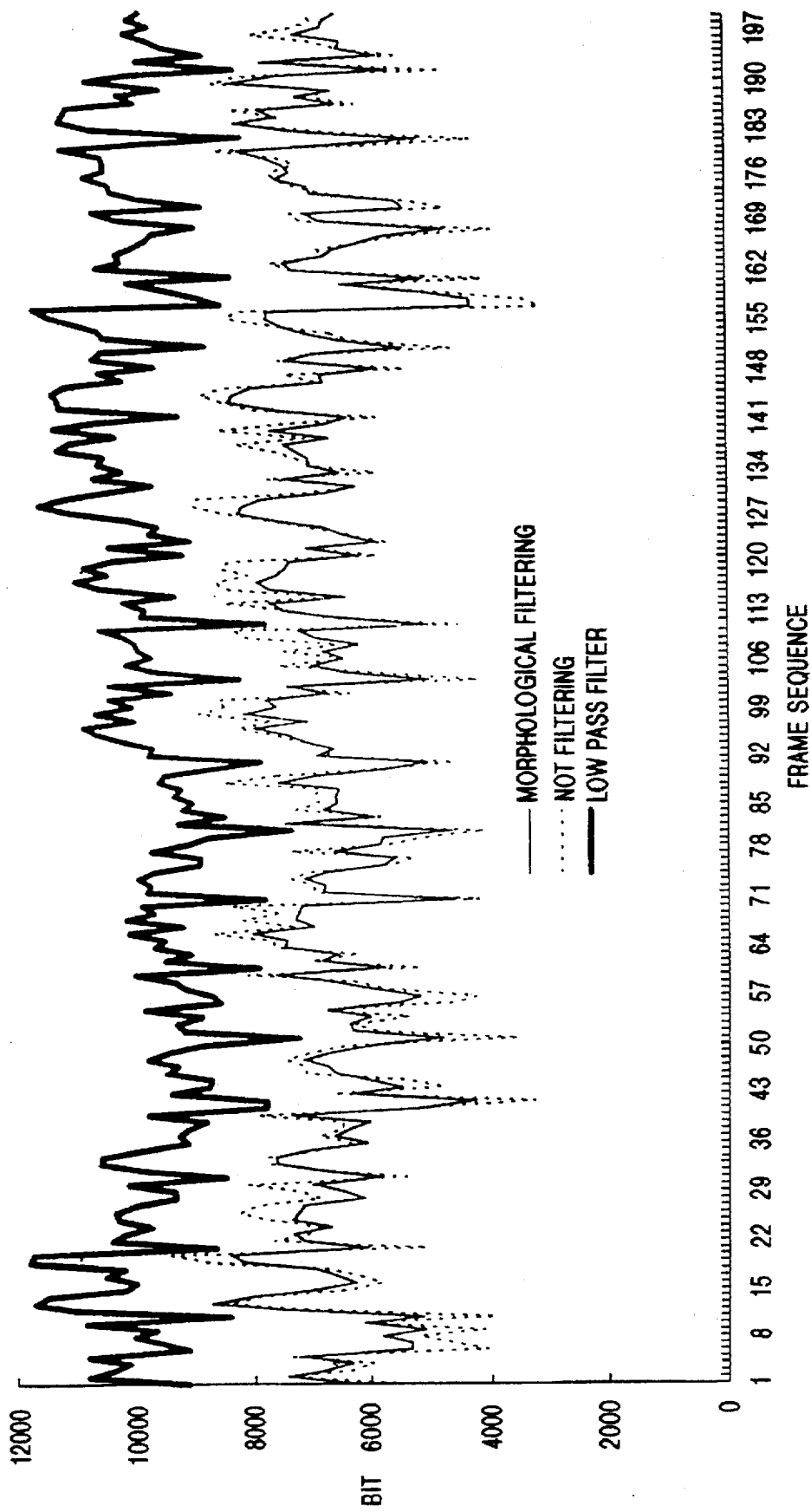
FIG. 8 shows a comparative waveform diagram on the bit needs for coding accumulated errors generated by the encoder according to the present invention shown in FIG. 4 and that by the Conventional hybrid DPCM/DCT encoder shown in FIG. 1.

FIG. 8 shows the bit generation amounts for generating the reconstructed image, each of which is generated by the encoder according to the present invention shown in FIG. 4, by the encoder shown in FIG. 1 and the encoder with the loop filter used in H.261. In FIG. 8, the bit generation amounts in the present invention show more stable distribution and are smaller than that by the other encoders on the average.

As described above, the method for video coding with processing accumulated error and the encoder therefor have advantages, i.e., the first is that random distributed noises due to the accumulated errors can be removed thereby, the second is that the bit generation amount can be reduced by filtering off the random accumulated errors with high frequency characteristics before coding, the third is that the simple construction of a general hybrid DPCM/DCT encoder can be preserved by inserting only a simple filter thereto, and the fourth is that the increase of the bit generation amounts due to frequent intra-mode performance for removing the accumulated errors can be eliminated fundamentally.

What is claimed is:

1. Method of video coding associated with processing accumulated errors, said method comprising the steps of:
   (a) generating motion vectors of an input image in a predetermined unit and the difference image between an image of filtering a motion-compensated image of a reconstructed previous frame and the input image on current frame, and then performing discrete cosine transform (DCT), quantization and variable length coding of the difference image;
   (b) generating said motion-compensated image of the reconstructed previous frame from the reconstructed previous frame in said step (a) and said motion vectors; and
   (c) filtering off accumulated errors while preserving the edges within said motion-compensated image of the reconstructed previous frame.

2. Method of video coding associated with processing accumulated errors as claimed in claim 1, wherein said step (c) is according to a morphological filtering method.

3. Method of video coding associated with processing accumulated errors as claimed in claim 1, wherein said step (c) is not performed on a refresh image without said accumulated errors.

4. Encoder for video coding associated with processing accumulated errors, said encoder comprising:
   coding means for generating motion vectors of an input image in a predetermined unit and the difference image between an image of filtering a motion-compensated image of a reconstructed previous frame and the input image of current frame, and then performing discrete cosine transform (DCT), quantization and variable length coding of the difference image;
   means for generating said motion-compensated image of the reconstructed previous frame from the reconstructed previous frame and said motion vectors; and
   filter for filtering off accumulated errors while preserving the edges within said motion-compensated image of the reconstructed previous frame and transmitting the filtered motion-compensated image to said coding means.

5. Encoder for video coding associated with processing accumulated errors as claimed in claim 4, wherein said filter works according to a morphological filtering method.

6. Encoder for video coding associated with processing accumulated errors as claimed in claim 4, wherein said filter does not work on a refresh frame without accumulated errors.

7. An image simplifying method by morphological filtering, comprising steps of:
   (a) sequentially performing dilation and a first erosion on a received original signal by using a structuring element of a first predetermined size, and performing a second erosion on said first-erosion processed signal by using a structuring element of a minimum size;
   (b) selecting the higher-level signal of said signal resulting from said step (a) and said original signal;
   (c) comparing said signal resulting from said step (b) with said first-erosion processed signal;
   (d) repeatedly performing said second erosion and said steps (b) and (c) if said signal resulting from said step (b) is different from said first-erosion processed signal in said step (c);
   (e) sequentially performing erosion and a first dilation on said original signal by using a structuring element of a second predetermined size, and performing a second dilation on said first-dilation processed signal by using said structuring element of a minimum size;
   (f) selecting the lower-level signal of said signal resulting from said step (e) and a signal generated when said signal resulting from said step (b) is identical to said first-erosion processed signal in said step (c); and
   (g) repeatedly performing said second dilation and said steps (e) and (f) if said signal resulting from said step (e) is different from said first-dilation processed signal, and a final simplified signal is output if said signal resulting from said step (e) is identical to said first-dilation processed signal.

* * * * *